United States Patent [19]

Reeder et al.

[11] 4,348,850

[45] Sep. 14, 1982

[54] WEB MEMBER

[75] Inventors: Milton E. Reeder, Ballwin; Walter G. Moehlenpah, Ladue, both of Mo.

[73] Assignee: Moehlenpah Industries, Inc., St. Louis, Mo.

[21] Appl. No.: 63,791

[22] Filed: Aug. 6, 1979

[51] Int. Cl.³ .................................................. E04C 3/02
[52] U.S. Cl. ........................................ 52/693; 52/696; 52/DIG. 6; 411/468
[58] Field of Search .......... 52/693, 696, 694, DIG. 6; 85/17, 13

[56] References Cited

U.S. PATENT DOCUMENTS

| | | | |
|---|---|---|---|
| 2,293,862 | 8/1942 | Sorenson | 85/17 |
| 3,025,577 | 3/1962 | Jureit | 52/693 |
| 3,416,283 | 12/1968 | Sanford | 52/693 |
| 3,708,942 | 1/1973 | Leonard | 52/693 |
| 3,951,033 | 4/1976 | Moehlenpah | 85/13 |
| 4,078,352 | 3/1978 | Knowles | 52/693 |
| 4,207,719 | 6/1980 | Knowles | 52/693 |

*Primary Examiner*—James L. Ridgill, Jr.
*Attorney, Agent, or Firm*—Senniger, Powers, Leavitt and Roedel

[57] ABSTRACT

A relatively flat sheet metal structural web member for interconnecting a pair of generally parallel spaced-apart chord members to form a floor truss or the like. The web member is generally V-shaped, comprising first and second legs integrally joined at one of their respective ends, and a plurality of teeth struck from opposite ends of the legs for being driven into the chord members. The teeth struck from of each leg are oriented to present their relatively wide surfaces generally broadside within the range of 45°–90° with respect to the central longitudinal plane of the leg for maximizing the resistance of the teeth to movement through the wood chord members so as to increase the load-holding capacity of the web member.

23 Claims, 11 Drawing Figures

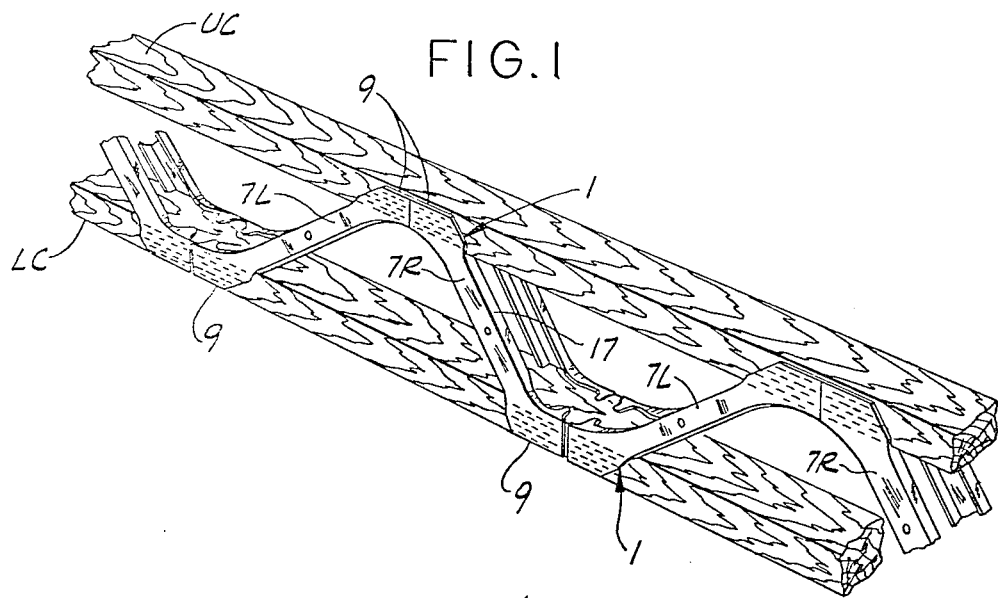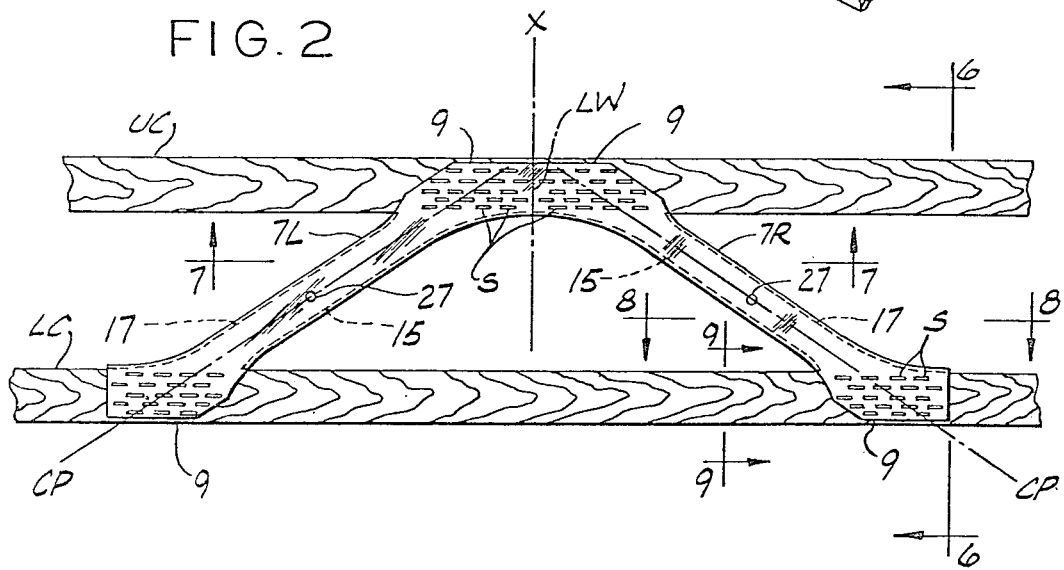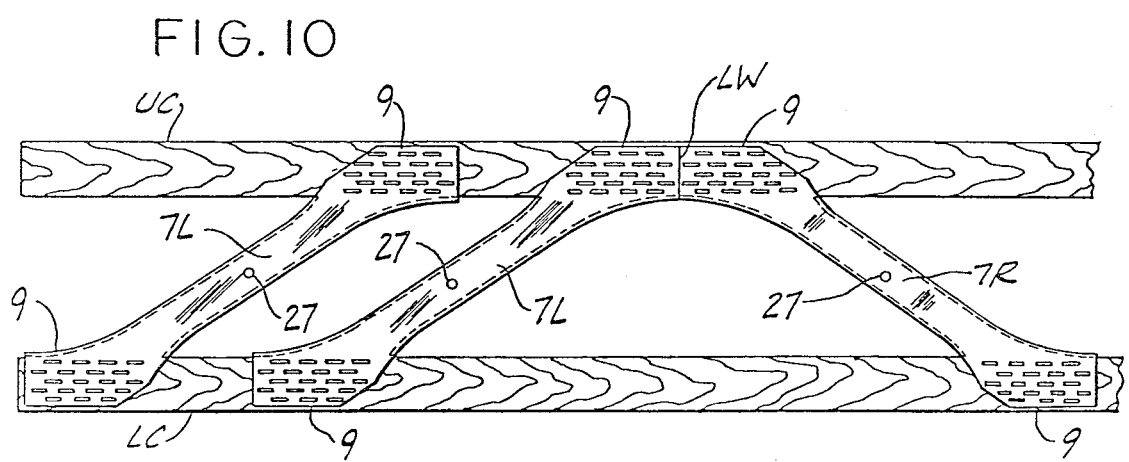

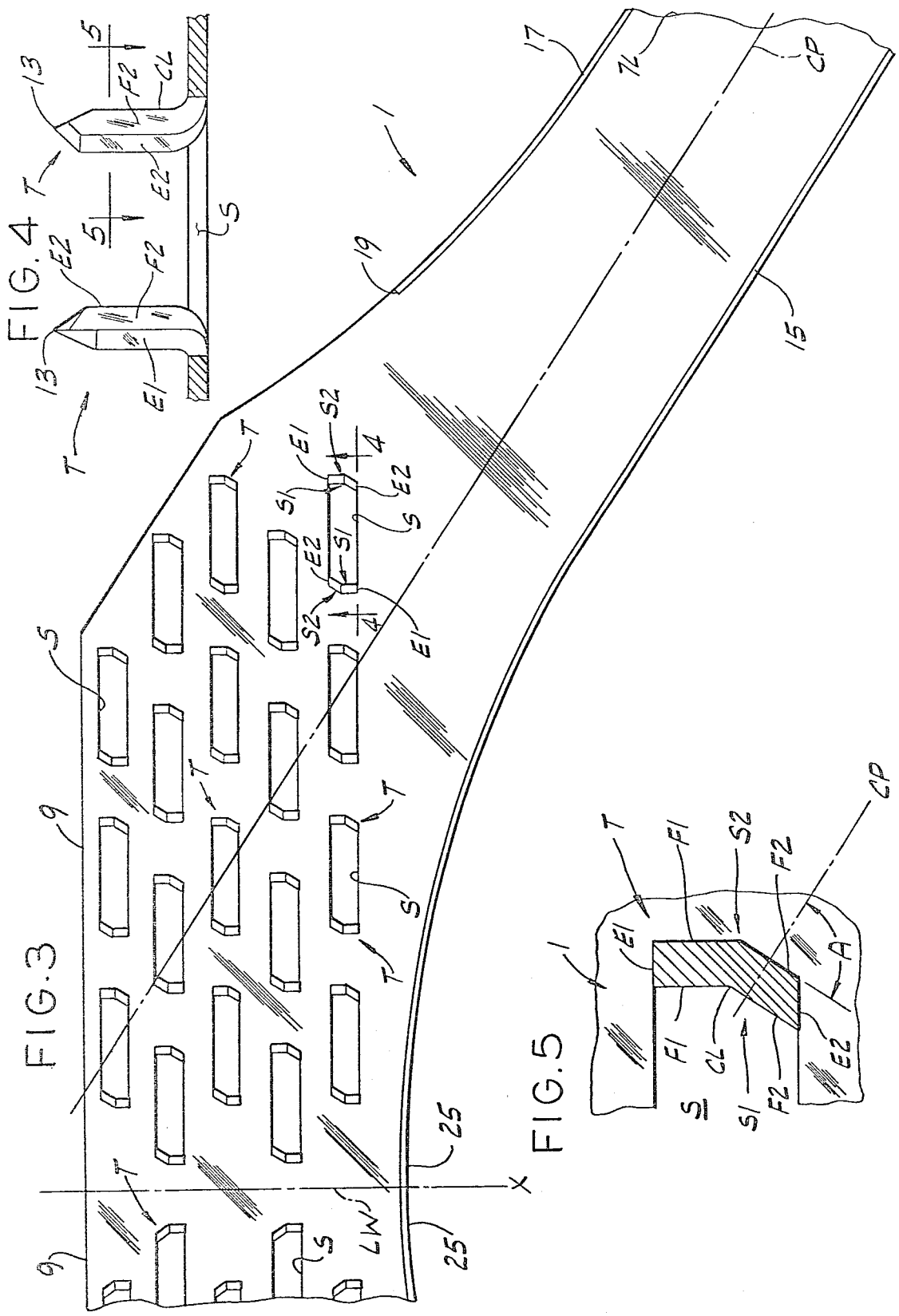

2

WEB MEMBER

BACKGROUND OF THE INVENTION

This invention relates to prefabricated building trusses and more particularly to combination wood-metal flat building trusses. The substitution of this type of truss for solid lumber floor and ceiling joists has become widespread for several reasons, one being the relatively high cost of such joists. Moreover, a combination wood-metal truss is lighter, stronger and enables duct work, piping and wiring to pass through the truss in the open spaces between the chord members.

Various types of metal web members have been utilized in the construction of prefabricated wood-metal trusses. In this connection, reference may be made to U.S. Pat. Nos. 3,416,283, 3,708,942 and 4,078,352.

SUMMARY OF THE INVENTION

Among the several objects of this invention may be noted the provision of an improved metal structural web member for use in fabricating flat building trusses (e.g., floor trusses); the provision of such a web member having an increased load-holding capacity; the provision of such a web member which is formed for ready and accurate assembly with the wood chord members of the truss; the provision of such a web member which is readily divisible into two separate structural members adapted for use, for example, at opposite ends of a truss to strengthen the truss; and the provision of such a web member which is economical to produce.

Generally, this invention involves a relatively flat sheet metal structural web member for interconnecting a pair of generally parallel spaced-apart wood chord members to form a floor truss or the like. The web member is generally V-shaped and comprises first and second legs integrally joined at one of their respective ends, a plurality of teeth struck from said one end of each leg and extending from one face, constituting the inside face, of the web member, these teeth being adapted to be driven into one of the chord members, and a plurality of teeth struck from the other end of each leg and extending from the inside face of the web member, these teeth being adapted to be driven into the other of the chord members. Each tooth is relatively wide in relation to its thickness, thereby having opposed relatively wide surfaces. The teeth struck from opposite ends of the first leg are oriented to present their relatively wide surfaces generally broadside within the range of 45°–90° with respect to the central longitudinal plane of the first leg or a plane parallel thereto, and the teeth struck from the opposite ends of the second leg are oriented to present their relatively wide surfaces generally broadside within the range of 45°–90° with respect to the central longitudinal plane of the second leg or a plane parallel thereto. Thus, the resistance of the teeth to movement through the wood of the chord members is maximized so as to increase the load-holding capacity of the web member.

Other objects and features of this invention will be in part apparent and in part pointed out hereinafter.

BRIEF DESCRIPTION OF THE DRAWINGS

FIG. 1 is a perspective of a portion of a flat floor truss comprising parallel chord members interconnected by a series of metal web members of this invention;

FIG. 2 is a front elevation of a web member of FIG. 1;

FIG. 3 is an enlarged rear elevation of a portion of the web member shown in FIG. 2;

FIG. 4 is an enlarged vertical section taken along line 4—4 of FIG. 3;

FIG. 5 is an enlarged horizontal section taken along line 5—5 of FIG. 4;

FIG. 10 is a front elevation of an end portion of a truss; and

Corresponding reference characters indicate corresponding parts throughout the several views of the drawings.

BRIEF DESCRIPTION OF THE PREFERRED EMBODIMENT

Figure 6:
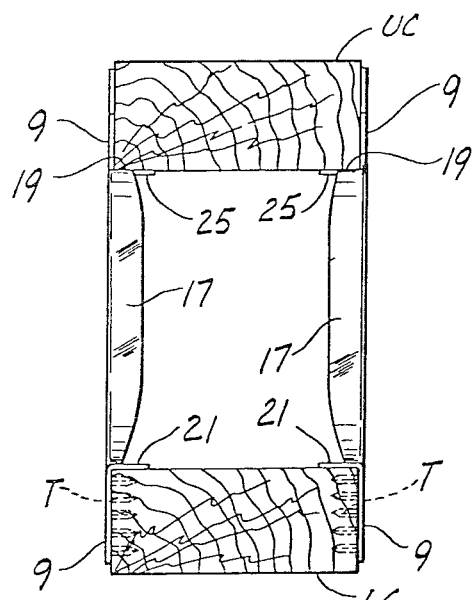
FIGS. 6–9 are enlarged sections taken along respective lines indicated in FIG. 2.

Referring now to the drawings, a portion of a flat truss T, such as a floor truss, is shown in FIG. 1 as comprising a pair of generally parallel vertically-spaced upper and lower wood chord members designated UC and LC, respectively, interconnected by metal structural web members of this invention, each of which is generally indicated at 1. The size of the wood chord members used will of course vary in accordance with structural and load requirements, but they may be, for example, 2"×4" wood members oriented with their 4" spaces generally horizontal. The web members, which are generally V-shaped, are spaced at equal intervals longitudinally of the truss T at opposite sides thereof with the web members on one side of the truss generally opposite those on the other side.

Each web member 1 is formed of a suitable gauge sheet metal, such as 20-gauge galvanized sheet steel, and has an inside face which faces the wood chord members and an outside face. As shown best in FIG. 2, the web member comprises a first (left-hand) leg 7L and a second (right-hand) leg 7R integrally joined at their upper ends along a vertical line of weakness LW which may be, for example, a score line. The end portions of each leg, indicated at 9, are enlarged, generally rectangular in shape and extend transversely with respect to the central longitudinal axis of the leg. A plurality of elongate teeth T are punched from these end portions 9 and extend generally at right angles from the inside face of the web member. In essence, therefore, the end portions of the legs constitute connector or nailing plates, the teeth T of which are embedded in the 2" edge faces of the upper and lower wood chord members.

The web member 1 is symmetric in two respects. First, it is generally axially symmetric about an axis X coincident with the line of weakness LW and extending centrally between the legs generally in the plane of the web member, one leg thus being a mirror image of the other. Moreover, the end portions 9 of each leg are substantially centrally symmetric with respect to one another, the center of symmetry being the midpoint of the leg on the central longitudinal axis of the leg. In other words, if one end portion 9 of a leg were swung along a 180° arc centered on the axial midpoint of the leg, it would substantially coincide with the opposite end portion of the leg.

As best illustrated in FIG. 3, teeth T are struck from each end portion 9 of the legs 7L, 7R to vacate a plurality of slots S. Each slot extends longitudinally of end portion 9 and has a pair of teeth at its ends, the tooth at one end of the slot being a substantial duplicate of the tooth at the other end of the slot. As shown, the slots S are arranged in rows (e.g., four rows) extending longitudinally with respect to the end portion 9 of the leg. The slots S in each row are equally spaced from one another, and the slots of adjacent rows are longitudinally offset or staggered approximately one-half the length of a slot so that the slots of alternate rows are in substantial vertical alignment with each other to form a plurality of columns (e.g., eight columns).

Each tooth T is relatively wide in relation to its thickness, having opposed relatively wide surfaces S1, S2 and opposed side edges E1, E2 convergent at the outer end of the tooth to form a tip 13. In accordance with one aspect of this invention, the tooth is oriented to present its relatively wide surfaces S1 and S2 generally broadside with respect to the central longitudinal plane CP of a respective leg or a plane parallel thereto. Inasmuch as the loading on the truss T is transmitted axially through the legs of the web member, this tooth orientation is important in that it ensures that the maximum amount of tooth area is at approximately right angles to the load so as to maximize the resistance of the tooth to movement through the wood chord members. This substantially increases the load-holding capacity of the web member.

More particularly, each tooth is generally V-shaped in section (thereby enabling the tooth to withstand greater compressive and bending forces than a straight tooth), with each of the surfaces S1 and S2 having a pair of facial portions F1 and F2 intersecting along a crimp line CL extending longitudinally of the tooth. Although these two faces are illustrated as being approximately equal in width (i.e., from crimp line CL to a respective side edge E1, E2), it will be understood that they may vary in width. The orientation of the tooth is such that the facial portion F1 of each surface S1, S2 extends generally widthwise of the end portion 9 of the leg (vertically as illustrated in FIGS. 3 and 5), and facial portion F2 extends generally transversely (i.e., broadside) with respect to the central longitudinal plane CP of the leg. Although the included angle A between this latter plane (or a plane parallel thereto) and the plane of the facial portion F2 is preferably about 90° so that the facial portion is presented fully broadside to forces transmitted axially through the leg, this angle may vary within the range of 45-90° without departing from the scope of this invention.

It will be understood that the teeth T are formed by a punch and die operation and that the cuts defining the side edges E1, E2 and facial portions F1, F2 of a tooth are so-called "air cuts", that is, cuts formed on initial contact of the punch with the plate without a die backing the plate in the area of the cut. Thus, the resulting shape of tooth T may vary somewhat from that shown in the drawings. For example, the facial portions F1 and F2 of the teeth may not be entirely planar but rather slightly curved so that the teeth are actually arcuate in section. The tooth also may be slightly twisted about its longitudinal axis. However, so long as the teeth are oriented to present their relatively wide surfaces S1 and S2 generally broadside within the range of 45-90° in relation to the central longitudinal plane CP of a respective leg, web member 1 will function within the scope of this invention.

As stated above, the end portions 9 of each leg are substantially centrally symmetric with respect to each other, and thus both the tooth pattern and number of teeth at opposite ends of each leg 7L, 7R are substantially identical. This ensures a uniform load distribution between opposite ends of the leg and over all the teeth of the leg. Moreover, since the web member is substantially axially symmetric about axis X, the load is evenly divided between the two legs, which, from a structural standpoint, act substantially independently of each other. This is important so that the web member is not subjected to large stresses causing it to tear along the line of weakness LW.

Figure 9:
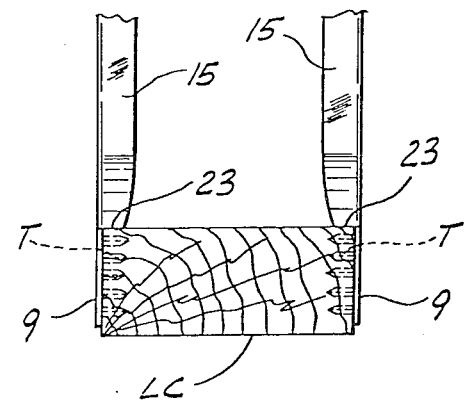
Figure 7:
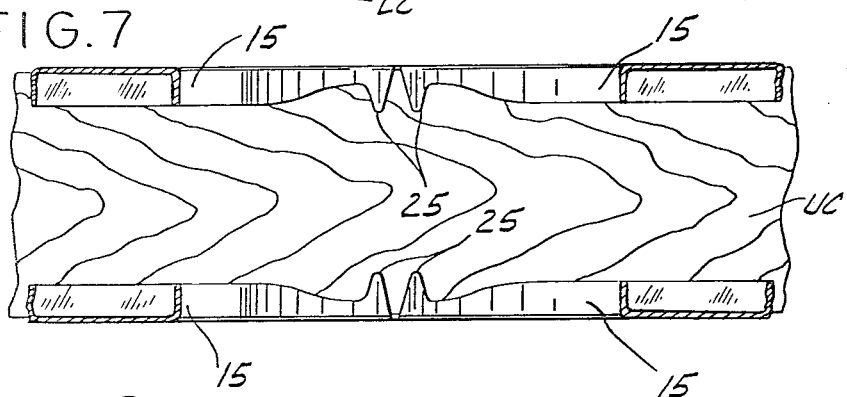
Figure 8:
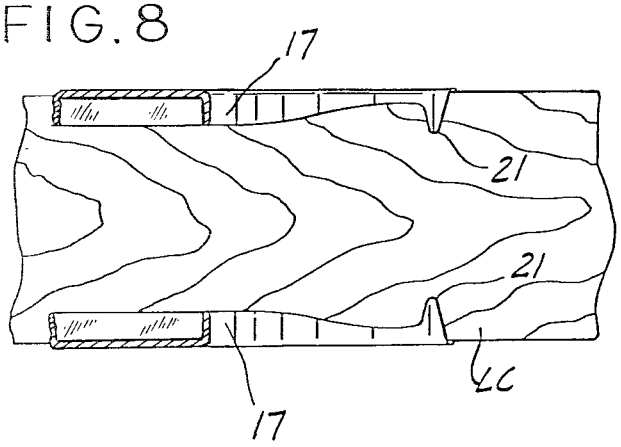

To increase the load-bearing capacity of the web member, the legs 7L, 7R are generally of channel shape. Thus, the side margins of each leg are bent generally at right angles to the leg on the inside face of the web member to form flanges extending longitudinally of the leg at opposite sides of the leg, the flange toward the middle of the web member being referred to as an inner flange and designated 15 and the flange at the other side being referred to as an outer flange and designated 17. As best illustrated in FIGS. 3 and 6, the outer flange 17 of each leg terminates at its upper end short of the upper end portion 9 of the leg in an edge 19 which extends generally perpendicularly to the inside face of the leg and which abuts the lower 4" face of the upper wood chord member UC. Flange 17 terminates at its lower end in an elongate tab or finger 21 at the outer end of the lower end portion 9 of the leg. This finger extends beyond the pointed tips of teeth T and abuts face-to-face with the upper 4" face of the lower chord member LC (FIGS. 6 and 8). The inner flange 15 of each leg terminates at its lower end short of the lower end portion 9 of the leg in an edge 23 which extends generally perpendicularly to the inside face of the leg and which abuts the upper 4" face of the lower wood chord member LC (FIG. 9). Flange 15 terminates at its upper end in an elongate tab or finger 25 (identical to finger 21) at the outer end of the upper end portion 9 of the leg. As shown in FIG. 7, this finger, which is longer than teeth T, abuts face-to-face against the lower 4" face of the upper wood chord member UC. The fingers 25 at the upper ends of the inner flanges 15 are relatively closely adjacent but are spaced apart on opposite sides of the line of weakness LW (FIG. 3).

The abutment of fingers 21, 25 and edges 19, 23 of the inner and outer flanges 15, 17 with the wood chord members is important in that this strengthens the legs in compression and inhibits buckling of the legs adjacent the end portions 9 of the legs. For reasons which will appear, each leg has a hole 27 in it generally at the midpoint of the leg along the central longitudinal axis of the leg.

The fingers 21, 25 at the upper ends of the inner flanges 15 and at the lower ends of the outer flanges 17 serve a second function (other than as abutments against the chord members UC, LC to strengthen the web member in compression), namely, they serve as means for locating the web member 1 in a transverse direction with respect to the wood chord members prior to securement of the web member to the chord members. In this connection, wood trusses, such as truss T, are formed by placing a first series of web members 1, teeth up, side-by-side on a horizontal surface (e.g., a jig table). The web members are properly located with respect to each other and maintained in fixed position by locator pins extending up from the table and through the holes 27 in the legs of the web members. The truss-forming process further involves placing the wood chord members UC, LC on the web members with the 2" edge faces of the chord members in contact with teeth T, placing a second series of web members, teeth down, on the chord members generally opposite the first series of web members, with the points of the teeth on the upper 2" faces of the chord members, and then pressing opposing web members together to drive teeth T into the chord members. In this process, it is important that the end portions 9 of the web members are centered transversely of the 2" edge faces of the chord members so that all teeth are embedded in the chord members during the pressing operation. Proper location of the end portions 9 with respect to the chord members is greatly facilitated by fingers 21, 25 which extend from the inside face of each web member beyond the tips of the teeth T. Abutment of these fingers against the opposing 4" faces of the chord members prior to the pressing operation ensures that the end portions 9 are properly located in the transverse direction on the 2" edge faces. The chord members are preferably held in a jig during the truss-forming process, with the spacing between the opposing 4" faces of the chord members maintained generally constant along the entire length of the truss. The spacing is such as to ensure abutment of the fingers against the 4" faces.

In accordance with this invention, a web member 1 may be divided into two separate structural members constituted by legs 7L and 7R by cutting along the line of weakness LW. The use of a single leg may be advantageous in several instances. For example, since stresses are typically the greatest at the ends of a truss, a left-hand leg may be placed at the left end of a truss parallel and closely adjacent the left-hand leg 7L of a web member 1 (see FIG. 10) and a right-hand leg placed at the right end of the truss parallel and closely adjacent the right-hand leg 7R of the web member 1. This arrangement strengthens the truss at its ends. A single leg 7L, 7R may also be used to "finish" a truss, that is, in instances where the length of the truss is not such as to be able to accommodate a series of full-size web members.

Figure 11:
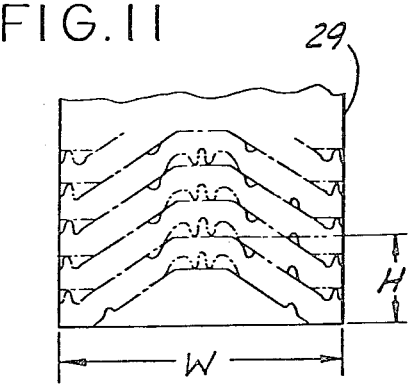
FIG. 11 is a view illustrating a step in the fabrication of web members of this invention.

Web members 1 of this invention are stamped in nested fashion from a continuous web 29 of sheet metal of suitable width W (FIG. 11), and then fed through a progressive die in which their formation is completed. For reasons of economy, it is preferable that the width of the web 29 be standard, such as 24", and that the overall width of the web members correspond to that of the sheet metal web. Thus, for a web member specified to have an overall height H of 9⅛" (for a 9¼" deep truss) and an overall width of 24", the included angle between the legs 7L, 7R of the web member will be about 93°. For web members specified to have heights of 7¼" and 11¼" (for 7¼" and 11⅜" deep trusses) and overall widths of 24", the included angles between the legs will be about 113° and 80°, respectively.

In view of the foregoing, it will be readily observed that a web member of this invention has an increased load-holding capacity, due in large part to the unique "broadside" orientation of the teeth, and to the unique inner and outer flanges 15, 17 which are formed for abutting the upper and lower chord members UC, LC so as to strengthen the legs in compression and increase their resistance to buckling. Moreover, the unique fingers 21, 25 of the web member facilitate locating the web member in a transverse direction with respect to the chord members during assembly of a truss. The web member is also economically produced.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A relatively flat sheet metal structural web member for interconnecting a pair of generally parallel spaced-apart wood chord members to form a floor truss or the like, said web member being generally V-shaped, comprising first and second legs integrally joined at one of their respective ends, a plurality of teeth struck from said one end of each leg and extending from one face, constituting the inside face, of the web member, said teeth being adapted to be driven into one of the chord members, and a plurality of teeth struck from the other end of each leg and extending from the inside face of the web member, said teeth being adapted to be driven into the other of said chord members, each tooth being relatively wide in relation to its thickness, thereby having opposed relatively wide surfaces, the teeth struck from opposite ends of the first leg being oriented to present said surfaces generally broadside within the range of 45°–90° with respect to the central longitudinal plane of the first leg or a plane parallel thereto, and the teeth struck from opposite ends of the second leg being oriented to present said surfaces generally broadside within the range of 45°–90° with respect to the central longitudinal plane of the second leg or a plane parallel thereto, the resistance of the teeth to movement through the wood of the chord members thereby being maximized so as to increase the load-holding capacity of the web member.

2. A web member as set forth in claim 1 wherein the web member is generally symmetrical about an axis extending centrally between the legs generally in the plane of the web member.

3. A web member as set forth in claim 1 wherein the ends of each leg are substantially identical in construction and centrally symmetric to each other, the center of symmetry being the midpoint of the leg on the central longitudinal axis of the leg.

4. A web member as set forth in claim 1 wherein the side margins of each leg are bent generally at right angles to the leg on the inside face of the web member to form flanges extending longitudinally of the leg at opposite sides thereof, the flange toward the middle of the web member constituting an inner flange and the other an outer flange, the outer flange of each leg having opposite end portions, one of which terminates short of an end of the leg in an edge extending generally perpendicularly to the inside face of the leg for abutment against a wood chord member when the teeth at that end of the leg are driven into the chord member, and the inner flange of each leg having opposite end portions, one of which terminates short of the other end of the leg in an edge extending generally perpendicularly to the inside face of the leg for abutment against the other wood chord member when the teeth at that end of the leg are driven into the chord member.

5. A web member as set forth in claim 4 wherein the other end portions of the inner and outer flanges are formed for abutment against the wood chord members.

6. A web member as set forth in claim 4 wherein the end portions of said inner flanges at the juncture of the legs are spaced apart.

7. A web member as set forth in claim 1 further comprising means on the inside face of the web member for abutment against the chord members to locate the web member in a transverse direction with respect to the chord members prior to securement of the web member to the chord members.

8. A web member as set forth in claim 7 wherein said locator means comprises finger means at opposite ends of the legs extending from the inside face of the web member beyond the pointed tips of the teeth, said finger means being adapted for abutment againt one face of one chord member and the opposing generally parallel face of the other chord member.

9. A web member as set forth in claim 8 wherein the side margins of each leg are bent generally at right angles to the leg on the inside face of the web member to form flanges extending longitudinally of the leg at opposite sides thereof, the flange toward the middle of the web member constituting an inner flange and the other an outer flange, said finger means comprising a finger at the end of each inner flange at said one end of each leg and a finger at the end of each outer flange at said other end of each leg.

10. A relatively flat sheet metal structural web member for interconnecting a pair of generally parallel spaced-apart wood chord members to form a floor truss or the like, said web member being generally V-shaped, comprising first and second legs integrally joined at one of their respective ends, a plurality of teeth struck from the one end of each leg and extending from one face, constituting the inside face, of the web member, said teeth being adapted to be driven into one of the chord members, and a plurality of teeth struck from the other end of each leg and extending from the inside face of the web member, said teeth being adapted to be driven into the other of said chord members, the side margins of each leg being bent generally at right angles to the leg on the inside face of the web member to form flanges extending longitudinally of the leg at opposite sides thereof, the flange toward the middle of the web member constituting an inner flange and the other an outer flange, the outer flange of each leg having opposite end portions, one of which terminates short of an end of the leg in an edge extending generally perpendicularly to the inside face of the leg for abutment against a wood chord member when the teeth at that end of the leg are driven into the chord member, and the inner flange of each leg having opposite end portions, one of which terminates short of the other end of the leg in an edge extending generally perpendicularly to the inside face of the leg for abutment against the other wood chord member when the teeth at that end of the leg are driven into the chord member.

11. A web member as set forth in claim 10 wherein the web member is generally symmetrical about an axis extending centrally between the legs generally in the plane of the web member.

12. A web member as set forth in claim 10 wherein the ends of each leg are substantially identical in construction and centrally symmetric to each other, the center of symmetry being the midpoint of the leg on the central longitudinal axis of the leg.

13. A web member as set forth in claim 10 wherein the other end portions of the inner and outer flanges are formed for abutment against the wood chord members.

14. A web member as set forth in claim 13 wherein said other end portions of the inner and outer flanges are formed to extend generally perpendicularly from the inside face of the web member for abutment against the chord members to locate the web member in a transverse direction with respect to the chord members prior to securement of the web member to the chord members.

15. A relatively flat sheet metal structural web member for interconnecting a pair of generally parallel spaced-apart wood chord members to form a floor truss or the like, said web member being generally V-shaped, comprising first and second legs integrally joined at one of their respective ends, a plurality of teeth struck from the one end of each leg and extending from one face, constituting the inside face, of the web member, said teeth being adapted to be driven into one of the chord members, and a plurality of teeth struck from the other end of each leg and extending from the inside face of the web member, said teeth being adapted to be driven into the other of said chord members, and means on the inside face of the web member extending beyond the tips of the teeth for abutment against the chord members to locate the web member in a transverse direction with respect to the chord members prior to securement of the web member to the chord members.

16. A web member as set forth in claim 15 wherein the web member is generally symmetrical about an axis extending centrally between the legs generally in the plane of the web member.

17. A web member as set forth in claim 15 wherein the ends of each leg are substantially identical in construction and centrally symmetric to each other, the center of symmetry being the midpoint of the leg on the central longitudinal axis of the leg.

18. A web member as set forth in claim 15 wherein the ends of each leg form a pair of elongate generally parallel connector plates extending generally transversely with respect to the central longitudinal axis of the leg, the connector plates at said one end of the legs being integrally joined along a line of weakness extending widthwise of the connector plates.

19. A web member as set forth in claim 15 wherein the number of teeth struck from said one end of each leg is substantially identical to the number of teeth struck from the other end of the leg.

20. A web member as set forth in claim 19 wherein the web member is generally symmetrical about an axis extending centrally between the legs generally in the plane of the web member.

21. A web member as set forth in claim 20 wherein said web member is formed with the line of weakness at the juncture of the legs on said axis of symmetry.

22. A web member as set forth in claim 15 wherein said locator means comprises finger means at opposite ends of the legs extending from the inside face of the web member beyond the pointed tips of the teeth, said finger means being adapted for abutment against one face of one chord member and the opposing generally parallel face to the other chord member.

23. A web member as set forth in claim 22 wherein the side margins of each leg are bent generally at right angles to the leg on the inside face of the web member to form flanges extending longitudinally of the leg at opposite sides thereof, the flange toward the middle of the web member constituting an inner flange and the other an outer flange, said finger means comprising a finger at the end of each inner flange at said one end of each leg, and a finger at the end of each outer flange at said other end of each leg.

* * * * *